United States Patent
Johnson et al.

(10) Patent No.: US 6,651,486 B1
(45) Date of Patent: Nov. 25, 2003

(54) STANDUP PRESSURE TESTING DEVICE AND METHOD

(75) Inventors: Danny A. Johnson, Van Alstyne, TX (US); Richard E. Shelton, Jr., Hurst, TX (US)

(73) Assignee: Basic Resources, Inc., Dallas, TX (US)

( * ) Notice: Subject to any disclaimer, the term of this patent is extended or adjusted under 35 U.S.C. 154(b) by 0 days.

(21) Appl. No.: 09/676,790

(22) Filed: Sep. 29, 2000

(51) Int. Cl.[7] .................................................. G01M 3/04
(52) U.S. Cl. ........................................................ 73/40
(58) Field of Search ................................ 73/40, 40.5 R, 73/49.1, 49.2, 49.3, 49.4, 49.5; 702/51

(56) References Cited

U.S. PATENT DOCUMENTS

| | | | |
|---|---|---|---|
| 69,423 A | * 10/1867 | Getty | 73/40.5 R |
| 1,543,989 A | * 6/1925 | Deck | 73/40.5 R |
| 2,446,219 A | * 8/1948 | Eaton | 73/40.5 R |
| 2,847,851 A | 8/1958 | Enell | |
| 2,976,063 A | * 3/1961 | Kuhlman | 285/119 |
| 2,981,095 A | 4/1961 | Eshbaugh | |
| 3,035,435 A | 5/1962 | Johnson | |
| 3,132,505 A | 5/1964 | Kuhlman | |
| 3,221,540 A | * 12/1965 | Kilbourn | 73/49.1 |
| 3,352,147 A | * 11/1967 | Ligon | 73/40.5 R |
| 3,459,229 A | * 8/1969 | Croft | 138/90 |
| 3,673,858 A | 7/1972 | Miller | |
| 4,364,261 A | * 12/1982 | Askwith et al. | 73/40 |
| 4,534,208 A | 8/1985 | Macin et al. | |
| 4,895,018 A | * 1/1990 | Asbra | 73/40.5 R |
| 4,998,434 A | * 3/1991 | Asbra | 73/40.5 R |
| 5,201,213 A | 4/1993 | Henning | |
| 5,548,993 A | 8/1996 | Alexander | |
| 5,665,903 A | 9/1997 | Moran | |
| 5,705,737 A | 1/1998 | Liao | |
| 5,983,706 A | * 11/1999 | Marks et al. | 73/37 |
| 6,209,560 B1 | * 4/2001 | Shaw | 137/14 |

OTHER PUBLICATIONS

Universal Plumbing Code, Section 1204.3.2, 1997.*
Trerice Catalogue, Low Pressure Gauges 765/766/767, Jan. 1, 2001.*
University of Colorado Health Sciences Center/University of Colorado Hospital Building and Construction Standards, Section 15110, Nov. 2000, found at http://www.uchsc.edu/facilities/ConStand/Div15/15110%20–%20Piping.doc.*

\* cited by examiner

*Primary Examiner*—Hezron Williams
*Assistant Examiner*—C D Garber
(74) *Attorney, Agent, or Firm*—Hunton & Williams LLP

(57) ABSTRACT

A pressure testing device comprising a connector adapted to engage a gas line containing a gas supply under pressure is provided. The pressure testing device includes a measuring device and a compressible pump. The measuring device operably communicates with the connector and is responsive to variations in pressure of the gas supply. The compressible pump has an input port and an exhaust port. The input port is adapted to receive ambient gases and the exhaust port is adapted to communicate with the measuring device for delivering ambient gas pressure to the measuring device.

3 Claims, 2 Drawing Sheets

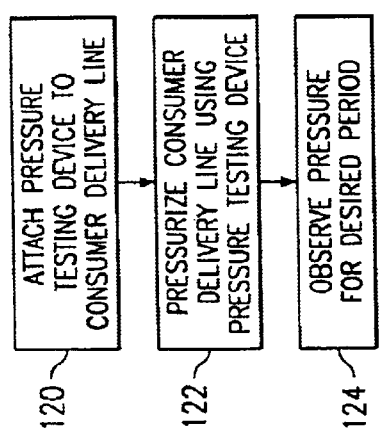
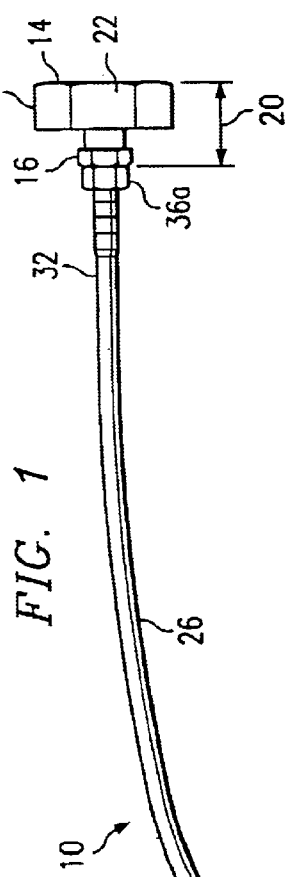
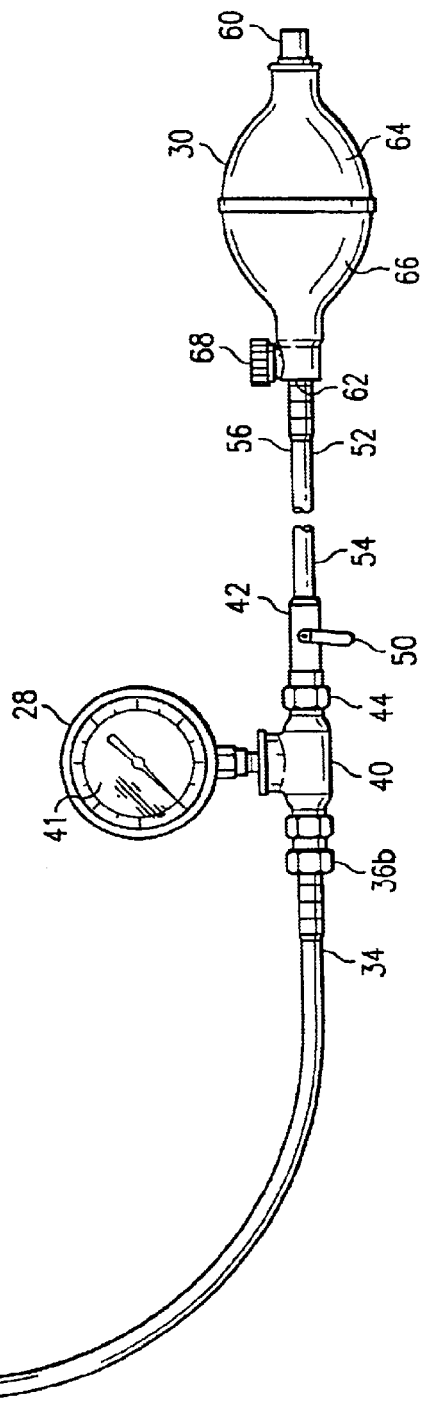

STANDUP PRESSURE TESTING DEVICE AND METHOD

TECHNICAL FIELD OF THE INVENTION

This invention relates generally to the field of pressure testing devices and more particularly, but not by way of limitation, to a device and method for detecting leaks in gas lines.

BACKGROUND OF THE INVENTION

Devices for testing and detecting leaks in natural gas supply lines are of great importance to ensure the safe delivery of natural gas to consumers. Natural gas leaks in supply lines present a tremendous danger to residential customers and commercial businesses.

Residential and business consumers of natural gas frequently employ a delivery line connected at a gas meter at a point on the consumer's property where the natural gas provider has positioned a distribution line. The consumer's delivery line feeds a supply of natural gas to tributary lines connected to specific residential appliances, such as gas heaters and ovens, or business appliances and equipment.

When new gas service is established or when a gas leak is suspected, the gas provider performs a test to determine whether the consumer's gas lines are capable of maintaining a fixed amount of pressure applied to the consumer's gas lines during the test.

In some instances of testing, the consumer appliances are disconnected from the supply of gas so that only the delivery and tributary lines within the consumer's structure are pressurized. Typically, this involves switching-off valves between the tributary lines and the appliances. In other testing instances, the consumer appliances remain connected for a more thorough test of the connections and components of appliances and equipment.

The consumer's gas system is pressurized to a predetermined level. The level of pressure is generally higher when only the tributary and delivery lines are tested and lower when the appliance connections are tested, since the appliance connections are not capable of withstanding high pressure testing without damage. In the event a decline in pressure is observed, the consumer's gas system is determined to have a gas leak requiring further maintenance.

However, where a gas leak exists between a tributary line and an appliance, it is apparent that high pressure testing of only the tributary and delivery lines would not reveal such a leak.

Often, gas meters include testing functionality capable of detecting leaks over an extended period of time, such as 10–15 minutes. However, the operator of the test must carefully monitor the gas meter's test dial since the slightest movement may indicate a gas leak. When employing other test devices, complex and time-consuming connections must first made between the testing device and the consumer's gas system.

Some pressure testing devices are large and difficult to move to rugged and remote locations where they are utilized. Frequently, these devices include complex pressuring systems capable of generating high pressures unnecessary for low pressure tests. The complexity of these high pressure testing systems adds to their expense and frailty.

To this end, a need exists for a pressure testing device and method of quickly and easily testing the entirety of a consumer's gas system for detecting leaks. Further, a need exists for a small, inexpensive device which is readily connected to the delivery line without interfering with the nearby gas meter.

SUMMARY OF THE INVENTION

From the foregoing it may be appreciated that a need has arisen for a pressure testing device and method for quickly and easily testing a consumers entire gas system. In accordance with the present invention, a standup pressure testing device and method are provided that substantially eliminate one or more of the disadvantages and problems outlined above.

One embodiment of the present invention provides a pressure testing device comprising a connector adapted to engage a gas line containing a gas supply under pressure. The pressure testing device includes a measuring device and a compressible pump. The measuring device operably communicates with the connector. The measuring device is responsive to variations in pressure of the gas supply.

The compressible pump has an input port and an exhaust port. The input port is adapted to receive ambient gases and the exhaust port is adapted to communicate with the measuring device for delivering ambient gas pressure to the measuring device.

In another embodiment, the pressure testing device is provided with a connector having a first side and a second side. The first side of the connector is adapted to engage a gas line containing a gas supply under pressure. The connector defines an opening extending therethrough the connector that is adapted to communicate with the gas supply.

The pressure testing device further includes a transmission line, a measuring device and a compressible pump. The transmission line is provided with a first end and a second end. The first end of the transmission line is attached to the second side of the connector for communicating the gas supply through the transmission line.

The measuring device is connected to the second end of the transmission line for responsive measurement of the pressure of the gas supply. The compressible pump operably communicates with the measuring device. The compressible pump has an input port and an exhaust port, the input port is adapted to receive ambient gases. The exhaust port is adapted to communicate ambient gas pressure to the measuring device.

The pressure testing device also includes a shut-off valve disposed between the measuring device and the compressible pump. The shut-off valve is capable of interfering with the communication of the gas supply from the compressible pump to the measuring device.

In another embodiment the compressible pump has a body with an outer surface defining an inner air chamber. The outer surface of the body is substantially collapsible by compression on the outer surface of the body by a hand of an operator. The compressible pump further includes a check-valve for inhibiting the flow of gas exiting the exhaust port from reentering the inner air chamber of the compressible pump.

In yet another embodiment of the present invention, a method of testing is provided for detecting leaks in a consumer gas supply system delivering a gas supply under pressure to a consumer structure. The method includes providing a pressure testing device comprising a connector that is adapted to engage a gas line containing a gas supply under pressure. The pressure testing device further includes a measuring device and a compressible pump. The measuring device operably communicates with the connector. The measuring device is responsive to variations in the pressure of the gas supply.

The compressible pump has an input port and an exhaust port. The input port is adapted to receive ambient gases and the exhaust port is adapted to communicate with the measuring device for delivering ambient gas pressure to the measuring device.

The method includes attaching the connector of the pressure testing device to the consumer gas supply system. The compressible pump is then compressed by the hand of an operator to a desired pressure. The operator observes the measuring device for a desired period of time to detect a leak in the consumer gas supply system.

Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which:

FIG. 1 is a side elevational view of a pressure testing device constructed in accordance with the present invention;

FIG. 3 is a flow chart illustrating a method for testing a gas supply system for detecting leaks constructed in accordance with the present invention;

DETAILED DESCRIPTION OF THE INVENTION

Figure 2:
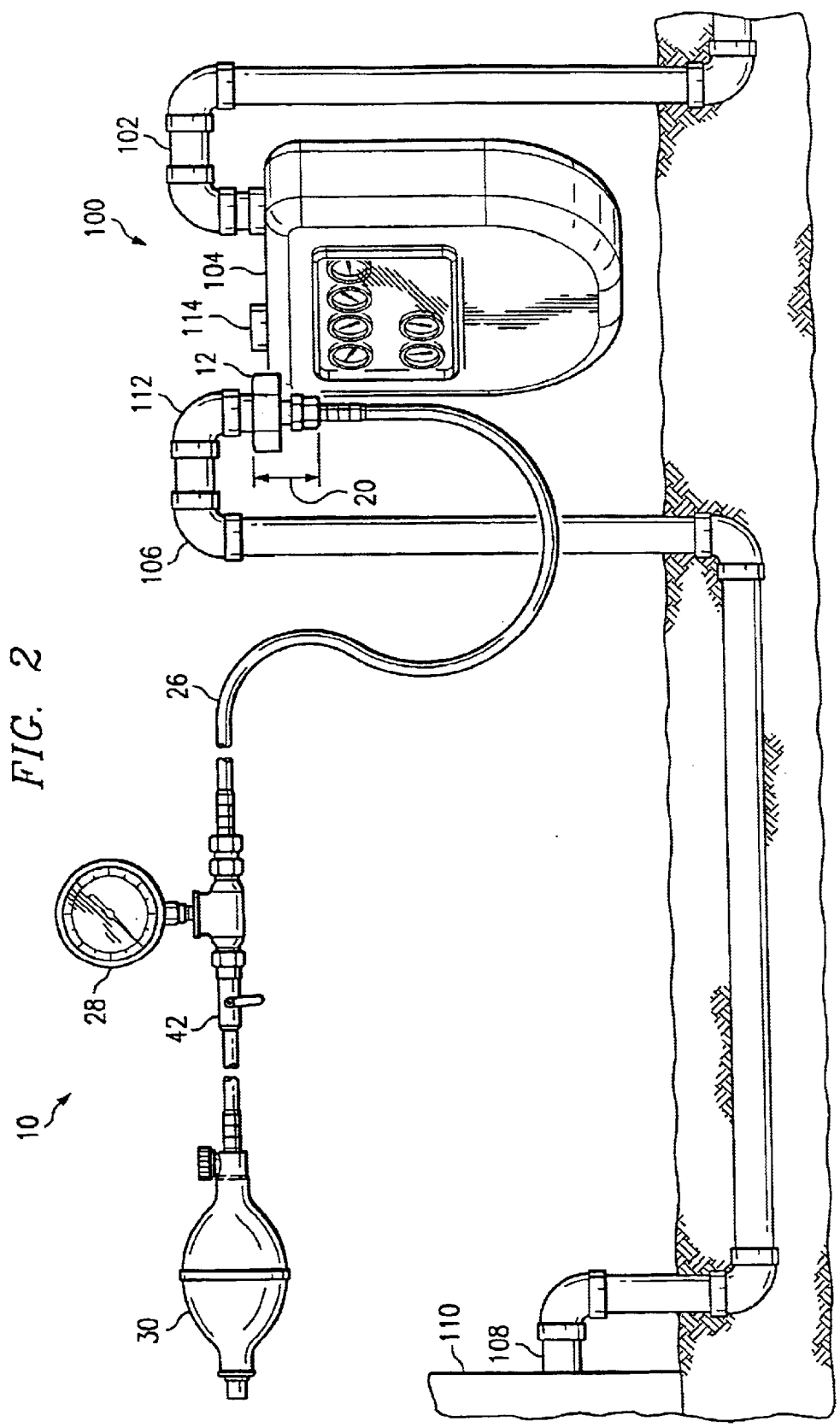
FIG. 2 is a perspective representation of a consumer gas delivery system employing the pressure testing device illustrated in FIG. 1.

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementation illustrated and described herein.

FIG. 1 is a side view of a pressure testing device 10 constructed in accordance with the present invention. The pressure testing device 10 is an inexpensive and easy to operate device for testing natural gas lines for detecting gas leakage. The pressure testing device includes a connector 12, the connector 12 has a first side 14 and a second side 16. The first side 14 of the connector 12 is adapted to engage a gas line containing a gas supply under pressure.

In one embodiment, the connector 12 is a 1 inch meter plug with a ¼ inch tap and may be constructed of metal or polymeric material. In another embodiment, the connector 12 may be 2 inches and adapted for threading engagement with the gas line. However, it should be understood that the connector 12 may be provided having other configurations adapted for accomplishing such connection which will readily suggest themselves to one of ordinary skill in the art.

The connector 12 has a low profile 20 between the first side 14 and the second side 16 thereof. The low profile 20 of the connector 12 is advantageous since attachment space, which will be discussed in greater detail hereinafter, is frequently limited. The connector 12 defines an opening 22 extending through the connector 12 from the first side 14 to the second side 16 for open communication with the gas supply.

The pressure testing device is further provided with a transmission line 26, a measuring device 28 and a compressible pump 30. In one embodiment, the transmission line 26 is a flexible tubular member which may be constructed of nylon tubing, rubber, polymeric material, or may be steel braided-hose. In another embodiment the transmission line 26 may be constructed of a substantially rigid material for specific applications.

The transmission line 26 has a first end 32 and a second end 34. The first end 32 of the transmission line 26 is attached to the second side 16 of the connector 12 for communicating the gas supply to the transmission line 26. The transmission line 26 may be attached in a variety of manners to the connector 12. In one embodiment, the pressure testing device 10 is provided with a plurality of threaded barbs 36, denoted alphanumerically 36a and 36b for purposes of clarity. The threaded barb 36a threadingly engages the second side 16 of the connector 12. The first end 32 of the transmission line 26 is disposed over the end of barb 36a for sealing engagement therewith.

The second end 34 of the transmission line 26 is connected to a t-connector 40 using the threaded barb 36b configuration in substantially the same manner as previously discussed. The transmission line 26 communicates the supply of gas, via the t-connector 40, to the measuring device 28 which is connected to the t-connector 40. The measuring device 28 generates a perceivable measurement on a display 41 of the measuring device 28 of pressure responsive to the pressure of the supply of gas. In one embodiment, a ⅔ inch pressure gauge may be suitable for the measuring device 28 to accurately measure the pressure of the gas supply.

A shut-off valve 42 is operably attached to a second side 44 of the t-connector 40. The shut-off valve 42 is provided with a lever 50 operable to communicate the gas supply from the t-connector 40 through the shut-off valve 42 in an open lever position (not shown) and inhibit the flow of the gas supply in a closed lever position (shown).

When the lever 50 of the shut-off valve 42 is in the open position the gas supply communicates with a line 52 connected to the shut-off valve 42 at a first end 54 of the line 52. The line 52 may be constructed from substantially similar materials to that of the transmission line 26. The line 52 may be provided having any length necessary for such purpose.

The line 52 is connected at a second end 56 to the compressible pump 30 and communicates the gas supply thereto. In one embodiment (not shown), the compressible pump 30 and shut-off valve 42 may be adapted for connection to the transmission line 26 at a point between the first and second ends 32 and 34 of the transmission line 26. However, the disposition of the compressible pump 30 and shut-off valve 42 shown in FIG. 1 may be preferable for maximum sealing engagement thereto and ease of use by the operator or individual.

The compressible pump 30 is provided with an input port 60, an exhaust port 62, a body 64 defining an inner air chamber 66, and a check valve 68. The check valve 68 is operable for regulating the flow of the gas supply from the inner air chamber 66 to the exhaust port 62. The input port 60 communicates with ambient gases, such as air, and operates to intake these ambient gases into the inner air chamber 66 of the compressible pump 30.

The body 64 of the compressible pump 30, in one embodiment, may be constructed of a substantially resilient material such as rubber or polymeric material. In such construction, when the body 64 of the compressible pump 30 is grasped by a hand of an individual (not shown) and compressingly engaged by the individual's hand, the body 64 collapses into the inner air chamber 66 forcing air through the check valve 68 to the exhaust port 62. In one embodiment, the compressible pump 30, is an aspirator bulb or hand pump provided with the check valve 68 integral thereto. However, it should be understood that the compressible pump 30 may be a bulb pump, an aspirator bulb, a hand pump having a substantially accordion configuration or other hand pumps having any configuration adapted for such uses which will readily suggest themselves to one of ordinary skill in the art.

Referring now to FIG. 2, a perspective representation of a consumer gas system 100 is illustrated employing the pressure testing device 10. The consumer gas system 100 includes a natural gas provider distribution line 102 connected to a gas meter 104. The consumer gas system 100 further includes a consumer delivery line 106 connected at a first end 108 to a structure 110 of the gas consumer and at a second end 112 to the pressure testing device 10 for testing. The connector 12 of the pressure testing device 10 is shown operably engaging the second end 112 of the consumer delivery line 106.

It should be understood that the pressure testing device 10 may be readily adapted for testing a variety of configurations of the gas meter 104, the natural gas provider distribution line 102, and the consumer delivery line 106. Furthermore, it is within the spirit and scope of the present invention to attach the pressure testing device 10 at various points along the second end 112 of the consumer delivery line 106.

In operation, the consumer delivery line 106 is disconnected from an attachment point 114 of the gas meter 104 such that the gas meter 104 may be rotatingly moved about the axis of the provider distribution line 102. It can be seen that the low profile 20 of the connector 12 is advantageous since limited space frequently exists between the gas meter 104 when disconnected from the consumer delivery line 106 for attachment thereto the consumer delivery line 106.

Additionally, the transmission line 26 extending from the connector 12 aids the operator of the pressure testing device 10 by allowing the operator to stand in an erect position, or standing-up, while monitoring the pressure measurements perceivable on the measuring device 28. It can be seen that by increasing the length of the transmission line 26, the operator is able to avoid obstacles such as trees, shrubs, or man-made obstacles and view the measuring device 28 from a more convenient location.

Since the consumer delivery line 106 is generally a gas delivery line having a small diameter and is occupied with a volume of natural gas and air prior to being disconnected, only minimal additional air need be applied for testing purposes. As previously discussed, leak testing of consumer gas systems typically requires pressurization in the range of 0–5 pounds of pressure per square inch and frequently 0–2 pounds of pressure per square inch. In such tests, appliances generally remain connected to tributary gas lines (not shown) inside the consumer structure 110 that are connected to the consumer delivery line 106. These appliance connections are frequently the source of natural gas leaks and are only testable under low pressure testing conditions.

Once connected, the pressure testing device 10 requires minimal effort, for example, 4–5 pumps by the hand of the operator on the compressible pump 30 to generate the necessary 0–5 pounds of pressure per square inch registerable on the measuring device 28. Once the pressurization is complete, even the slightest natural gas leaks will rapidly result in a noticeable decline in the registered pressure on the measuring device 28, for example within a few, 5–10, seconds. Employing the pressure testing device 10, minimal leakage of natural gas from the consumer distribution line 106, tributary lines, or appliance connections, generally results in observable declining pressure being detectable within one minute.

It should be appreciated that in the operation of natural gas systems, where hundreds or even thousands of such systems are tested daily, the present invention provides a simple device that is inexpensive to construct and operate capable of detecting minimal gas leaks within a considerably shortened period of time. This results in tremendous savings of time, in both the speed of effecting the test and the accuracy provided by the pressure testing device 10.

Additionally, the design of the pressure testing device 10 provides for a rugged testing device that is not sensitive to heat or cold, direct sunlight, and may be readily stored unprotected.

Referring now to FIG. 3, in one embodiment, the present invention provides for a method of testing for detecting leaks in the consumer gas supply system 100. The method includes providing the pressure testing device 10 of the present invention. At a first block 120, attach pressure testing device 10 to consumer delivery line 106, the connector 12 of the pressure testing device 10 is attached to the consumer delivery line 106.

At a block 122, pressurize consumer delivery line 106 using pressure testing device 10 is accomplished by compressing the compressible pump 30 by the hand of the operator. As previously discussed, this is generally accomplished using 4–5 compression strokes on the compressible pump 30 as necessary to generate the desired registerable pressure on the measuring device 28, such as 0–5 pounds of pressure.

At a block 124 observe pressure for desired period, the operator perceives the pressure measurement of the measuring device 28 for a sufficient time period to determine whether a leak exists. As previously discussed, the time period necessary for a leak to result in an observable reduction in the measurable pressure may be as short as 5–10 seconds and generally not longer than about one minutes Other examples of changes, substitutions, and alterations are readily ascertainable by one skilled in the art and could be made without departing from the spirit and scope of the present invention.

What is claimed is:

1. A method of testing a consumer gas supply system for leaks, the method comprising:

providing a gas meter and a consumer gas supply system for supplying natural gas to a consumer structure;

providing a pressure testing device comprising:

a substantially rigid connector adapted to engage a portion of the consumer gas supply system, a measuring device communicating with the substantially rigid connector and responsive to variations in pressure of the consumer gas supply system, the measuring device to indicate measurement of up to 10 pounds per square inch of pressure and having a face provided with a plurality of indicia indicating fractional pound increments of pressure, a bulb pump having a body constructed of a substantially resilient material collapsible by gripping compression on the outer surface of the body by a hand of an operator, the bulb pump having an input port adapted to receive ambient gases and an exhaust port that communicates with the measuring device for delivering ambient gas pressure, and a transmission line having a first end coupled adjacent the substantially rigid connector, a second end coupled adjacent the measuring device and a length sufficient for the operator to compress the bulb pump and perceive the pressure measured by the measuring device while the operator stands substantially erect when the substantially rigid connector is coupled to the consumer gas supply system, and a shut-off valve disposed between the measuring device and the bulb pump capable of inhibiting the flow of gas from the bulb pump to the measuring device;

attaching the substantially rigid connector of the pressure testing device to the consumer gas supply system in sealing engagement;

compressing the bulb pump not more than 25 times to generate up to 10 pounds of pressure per square inch in the consumer gas supply system measurable on the measuring device;

engaging the shut-off valve to inhibit the flow of gas between the bulb pump and the measuring device to prevent leakage from the pressure testing device; and detecting a leak in the consumer gas supply system in less than 3 minutes by perceiving a measurable drop in pressure measured by the measuring device.

2. A method of testing a low pressure consumer gas supply system for leaks, the method comprising:

providing a gas meter and a low pressure consumer gas supply system for supplying natural gas to a consumer structure;

providing a pressure testing device comprising:
　a substantially rigid connector adapted to engage a portion of the low pressure consumer gas supply system,
　a measuring device communicating with the substantially rigid connector and responsive to variations in pressure of the low pressure consumer gas supply system, the measuring device to indicate measurement of not more than 3 pounds per square inch of pressure and having a face provided with a plurality of indicia indicating fractional pound increments of pressure,
　a transmission line having a first end coupled adjacent the substantially rigid connector and a second end coupled adjacent the measuring device,
　a pump having an input port adapted to receive ambient gases and an exhaust port that communicates with the measuring device for delivering ambient gas pressure, and
　a shut-off valve disposed between the measuring device and the pump capable of inhibiting the flow of gas from the pump to the measuring device;

attaching the substantially rigid connector of the pressure testing device to the low pressure consumer gas supply system in sealing engagement;

pumping the pump not more than 25 times to generate not more than 10 pounds of pressure per square inch in the low pressure consumer gas supply system measurable on the measuring device;

engaging the shut-off valve to inhibit the flow of gas between the pump and the measuring device to prevent leakage from the pressure testing device; and detecting a minor leak in the low pressure consumer gas supply system in less than 3 minutes by perceiving a measurable drop in pressure measured by the measuring device.

3. A method of testing a low pressure consumer gas supply system for leaks, the method comprising:

providing a gas meter and a low pressure consumer gas supply system for supplying natural gas to a consumer structure;

providing a pressure testing device comprising:
　a substantially rigid connector adapted to engage a portion of the low pressure consumer gas supply system,
　a measuring device communicating with the substantially rigid connector and responsive to variations in pressure of the low pressure consumer gas supply system, the measuring device to indicate measurement of not more than 3 pounds per square inch of pressure and having a face provided with a plurality of indicia indicating ounce increments of pressure,
　a transmission line having a first end coupled adjacent the substantially rigid connector and a second end coupled adjacent the measuring device,
　a pump having an input port adapted to receive ambient gases and an exhaust port that communicates with the measuring device for delivering ambient gas pressure, and
　a shut-off valve disposed between the measuring device and the pump capable of inhibiting the flow of gas from the pump to the measuring device;

attaching the substantially rigid connector of the pressure testing device to the low pressure consumer gas supply system in sealing engagement;

pumping the pump not more than 25 times to generate not more than 10 pounds of pressure per square inch in the low pressure consumer gas supply system measurable on the measuring device;

engaging the shut-off valve to inhibit the flow of gas between the pump and the measuring device to prevent leakage from the pressure testing device; and detecting a minor leak in the low pressure consumer gas supply system in less than 3 minutes by perceiving a measurable drop in pressure measured by the measuring device.

* * * * *